United States Patent
Droll

[11] 3,863,335
[45] Feb. 4, 1975

[54] PROCESS AND APPARATUS FOR BENDING THE ENDS OF INSULATING STRIPS IN GROOVES OR STATORS OF ELECTRICAL MACHINES

[76] Inventor: Hans Droll, 6 Bergen-Enkheim, Nordring, Germany

[22] Filed: Apr. 5, 1974

[21] Appl. No.: 458,432

[30] Foreign Application Priority Data
May 10, 1973 Germany............................ 2323590

[52] U.S. Cl.................. 29/596, 29/205 E, 264/249, 310/215, 425/383, 425/393
[51] Int. Cl. ............................................ H02k 15/02
[58] Field of Search........... 29/596, 205 E; 310/215; 264/249, 251; 425/383, 384, 392, 393

[56] References Cited
UNITED STATES PATENTS

| | | | |
|---|---|---|---|
| 1,974,406 | 9/1934 | Apple | 310/215 |
| 3,315,105 | 4/1967 | Moore, Jr. | 310/215 X |
| 3,514,836 | 6/1970 | Mason | 29/205 E |
| 3,754,310 | 8/1973 | Shea | 264/249 X |

*Primary Examiner*—Carl E. Hall
*Attorney, Agent, or Firm*—Larson, Taylor and Hinds

[57] ABSTRACT

A method and apparatus for bending the ends of thermoplastic insulating strips located in stator grooves back against the end faces of the stators. The ends are heated, bent back 90° while heated, and then held down as they cool off. Hot stamps engage both end portions of each strip while the stamps move towards their respective stator end faces at equal and opposite speeds, simultaneously pressing back both ends of each strip. A cold stamp is preferably mounted within each hot stamp so as to engage the bent back ends promptly after removal of the hot stamp. The apparatus may include a plurality of operating stations with the stators movable between them.

26 Claims, 8 Drawing Figures

PROCESS AND APPARATUS FOR BENDING THE ENDS OF INSULATING STRIPS IN GROOVES OR STATORS OF ELECTRICAL MACHINES

BACKGROUND OF THE INVENTION

This invention relates to an apparatus and a process for bending of the ends of insulating strips, especially strips from polyethyleneterephthalate, in grooves of stators of electric machines and the like and an apparatus to carry out the process.

In stators of electric machines or the like, the coil wires must be insulated against the laminated core of the stator. An insulating wire coating made for example from lacquer serves this purpose, along with an insulating lining of the stator grooves in which the coils are received. Customarily this lining consists of insulating strips which are pushed into the grooves prior to insertion of the coils. This is possible since the strips are essentially U-shaped elastic preforms which correspond to the cross section of the groove, such that as a result of their inherent elasticity they fit against the inside wall of the groove.

For safety reasons the insulating strips are of such a length that they project axially from the grooves beyond both axial ends of the laminated stator. In order to secure them against any shifting in an axial direction, the ends of the strip projecting from the ends of the laminated core of the stator are turned back by 180° similarly to the collar of a shirt. This turning back of the ends of the strips takes place prior to the elastic molding of the strips in the longitudinal direction corresponding to the cross section of the groove. By this latter elastic molding which forms the U-shaped cross section, and by the retention of this shape as a result of the clamping of the insulating strips in the stator grooves, one will prevent subsequent stretching of the previously turned back strip ends notwithstanding the elasticity of the strip material.

In many cases, for example in the case of three-phase generators, the projecting "collars" of the insulating strips which project beyond the end surfaces of the laminated core of the stator interfere since it is often desirable to keep the generators or the motors as flat as possible. For this reason the expedient has already been suggested of dispensing with the insulating strips and in lieu thereof, providing the entire laminated core of the stator with an insulating coating. This, however, is a very expensive procedure.

The excess of the insulating strips at both ends of the laminated core of the stator could also be eliminated in such a way that the ends are bent back by only 90° instead of 180°, fitting against the end surfaces of the stator, after introduction of the insulating strips in the grooves. However, up to this point, all attempts made in this direction have failed because of the characteristics of the insulating material used for the strips. The most common material at this time is polyethyleneterephthalate, which is easily obtainable in the form of insulating strips, for example under the tradenames Mylar, Hostaphan, Terphane and Melinex. Although these are basically thermoplastics, they have the characteristic of partially springing back while in their heated state after deformation, and consequently it seemed that a hot deformation of the ends of the insulating strips with the goal in mind of fitting them flat against the end surfaces of the laminated core of the stator would be out of the question.

SUMMARY OF THE INVENTION

The purpose of the present invention is to provide a process and a corresponding apparatus with the aid of which a lasting heat deformation of the ends of the insulating strips can be achieved notwithstanding the above described deterrent characteristic of the material.

According to the present invention, this purpose is achieved by heating the ends of the insultating strips and bending them back against the end surfaces of the laminated core of the stator and holding them down until they cool off.

It has been found to be particularly effective to hold the ends of the insulating strips in the laminated core of the stator in their bent over position by means of a hot stamp for at least about 2 to 3 seconds and then within about 2 seconds after withdrawal of the hot stamp, to press down the ends by means of a cold stamp and to hold them there for about 2 to 3 seconds.

The short intermediate time between withdrawal of the hot and pressing down of the cold stamp has been found to be especially advantageous. However this creates the problem of providing means for manipulating the stamps and of providing the operational drives therefor so that the above mentioned short intermediate time of approximately 2 seconds will not be exceeded. In a preferred embodiment of the invention this is achieved by providing the hot and the cold stamps so as to include a multiplicity of annularly disposed individual stamps, the number of which correspond to the number of insulating strips that are to be bent back in one operation. The individual stamps of the hot stamp are developed on a heated ring movable axially against that stator end. Each stamp consists of a projection, the cross section of which fits into the cross section of a groove of the laminated core of the stator aligned with an insulating strip and of a stepshaped stamp surface surrounding said projection. The individual stamps of the cold stamp are developed in the form of a flap or a finger and are attached to an axially movable guide element so as to be radially movable or slideable relative thereto. This radial movement of the cold individual stamps presses down the ends of the insulating strips during cooling off which can already have started as soon as the hot stamp has been withdrawn only by a short distance.

BRIEF DESCRIPTION OF THE DRAWINGS

The invention will be explained in greater detail subsequently with respect to a preferred embodiment as shown in the drawings by way of example, wherein.

DETAILED DESCRIPTION OF THE PREFERRED EMBODIMENT

Figure 1:
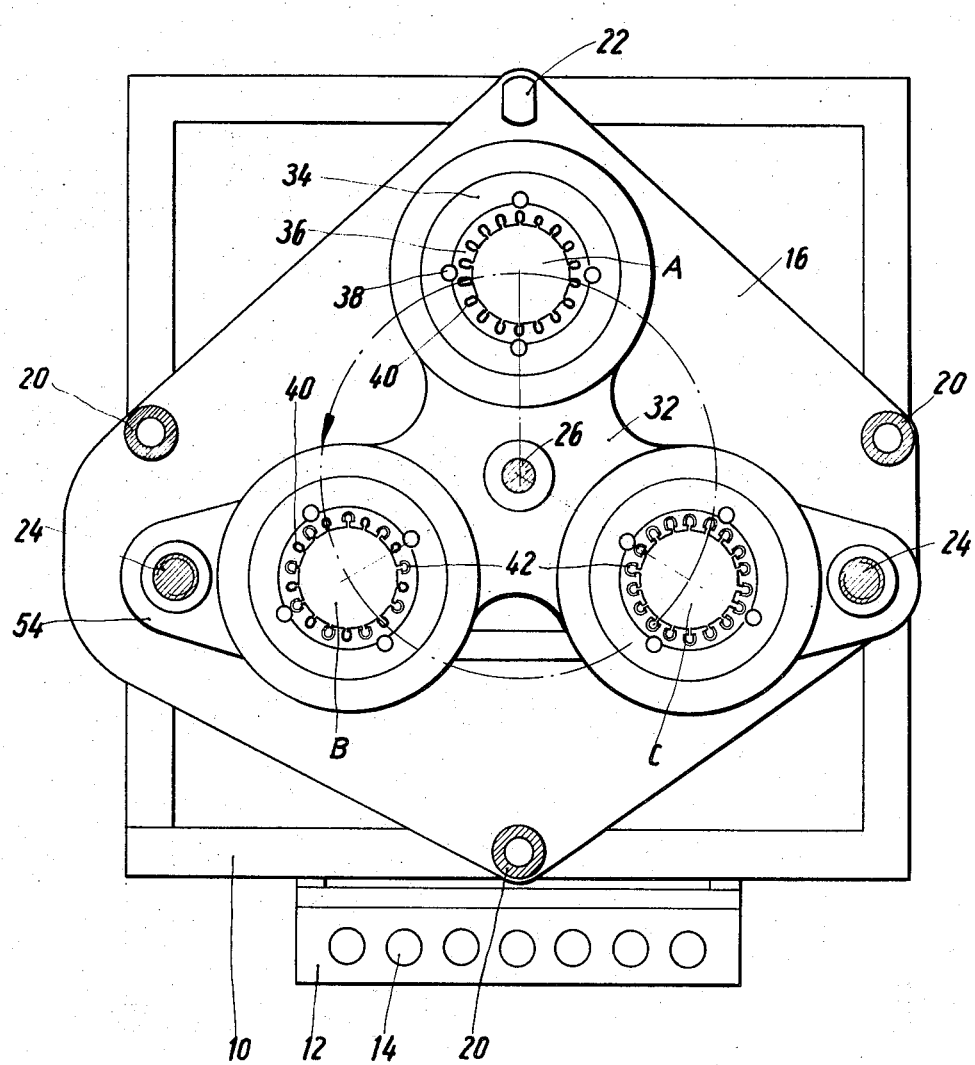
FIG. 1 is a cross section through an apparatus according to the invention with a revolving table with three operating stations.

Referring now to the drawings, like numerals represent like elements throughout the several views.

Figure 2:
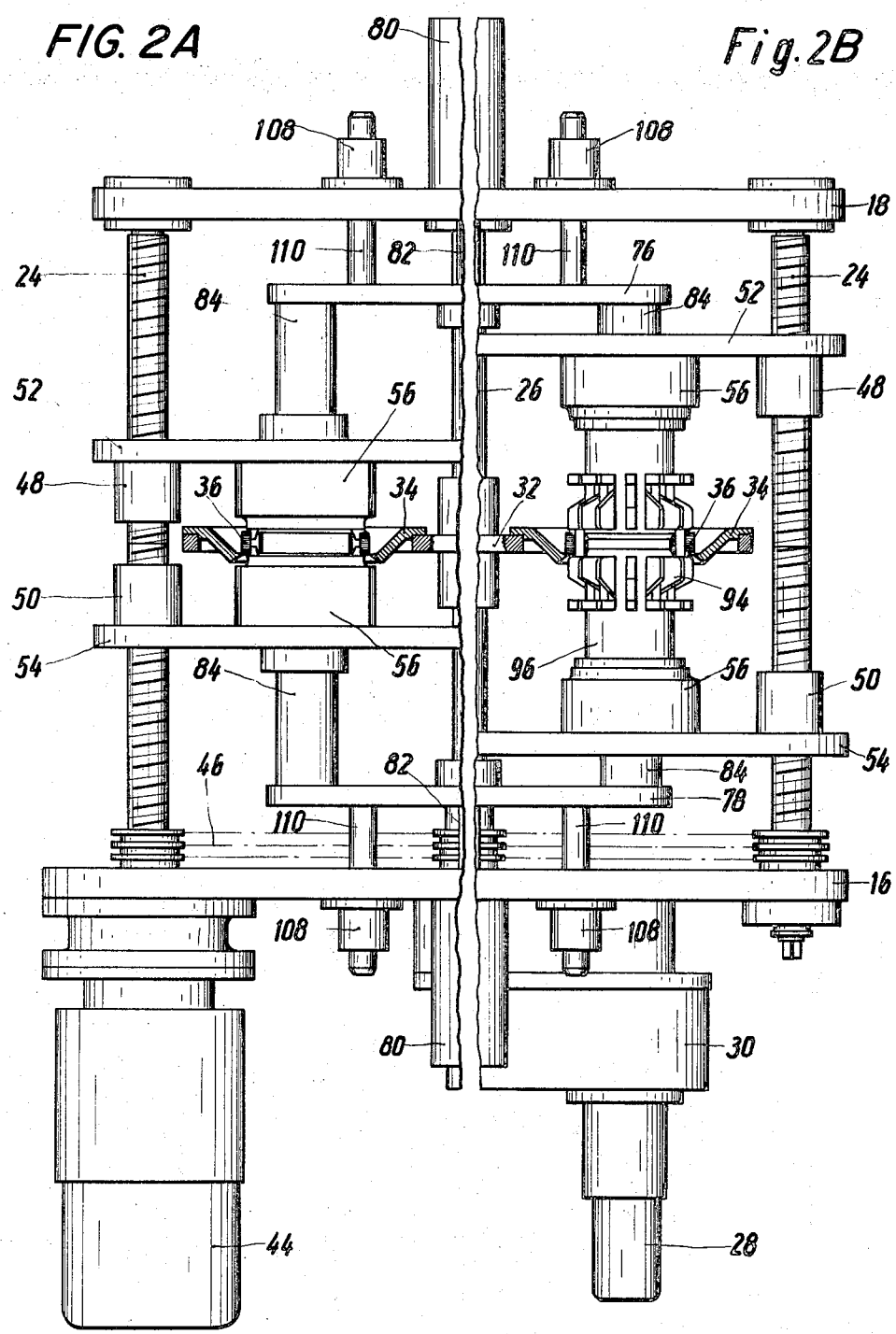
FIGS. 2A and 2B (referred to at times collectively as FIG. 2) are simplified side views of the apparatus according to FIG. 1, each showing a different side of the centerline and each showing a different operating position of the invention.

The apparatus shown in the drawing has a base frame 10 shown in FIG. 1, to which a control panel 12 is attached, with for example knob 14 for the various machine functions. Firmly connected with the base frame 10 is a lower machine plate 16 and an upper machine plate 18. The attachment is accomplished by screwing them together by means of strong bolts 20. A further attaching element is indicated at 22. In FIG. 2, the base frame 10 has been omitted in order to simplify the drawing. Two threaded ball bearing rotational spindles 24, as well as a central shaft 26 are mounted rotatably in the lower and upper machine plate 16 and 18. Said shaft 26 is turned step-by-step each time by 120° by a driving motor 28 by way of a Geneva movement 30. A revolving table 32 is firmly connected with the shaft 26, which table is developed with three annular or disc shaped supports 34 into which during each step one laminated stator core 36 can be inserted. Four balls 38, engaging with fitting recesses of the laminated core of the stator, hold and center the laminated core 36 of the stator (FIG. 1). By the step-by-step revolution of the shaft 26 of the revolving table 32, a laminated stator core inserted into the support 34 at the operating station designated with A, is conveyed first to the operating station B, then to the station C and finally back again to station A, where it is removed in a completely processed state and can be exchanged for a new laminated stator core.

In FIG. 1, the insulating strips lining the stator grooves are designated by 40. In the operating station A there just happens to be a laminated stator core, the insulating strips of which are not yet bent back. In the operating station B every second insulating strip is bent back by 90° at both of its ends, so that the ends fit flatly against the end surfaces of the laminated stator core. The bent back ends of an insulating strip are designated in FIG. 1 by 42. In the operating station C, the ends of the remaining insulating strips are then bent back.

The ball spindles 24 can be driven by a motor 44 by way of a chain or a toothed belt in both rotational directions. The direction and the pitch of the threads of the spindles 24 are in opposite directions on the top and on the bottom. In this manner upon rotation of the spindles, two nuts 48 and 50, cooperating with the two sections of the thread, will always shift equally in opposite axial directions. An upper rail 52 is connected with the nuts 48 of the two threaded spindles 24. In the same manner a lower rail 54 extends between the two nuts 50. Both rails are shown in FIGS. 2A and 2B in different positions. Each rail 52, 54 carries two stamps 56, which are to be heated electrically, whereby the stamps 56 of the upper rail 52 are aligned with those of the lower rail 54 as well as with the laminated stator 36 at the operating stations B and C.

Figures 4A, 4B:
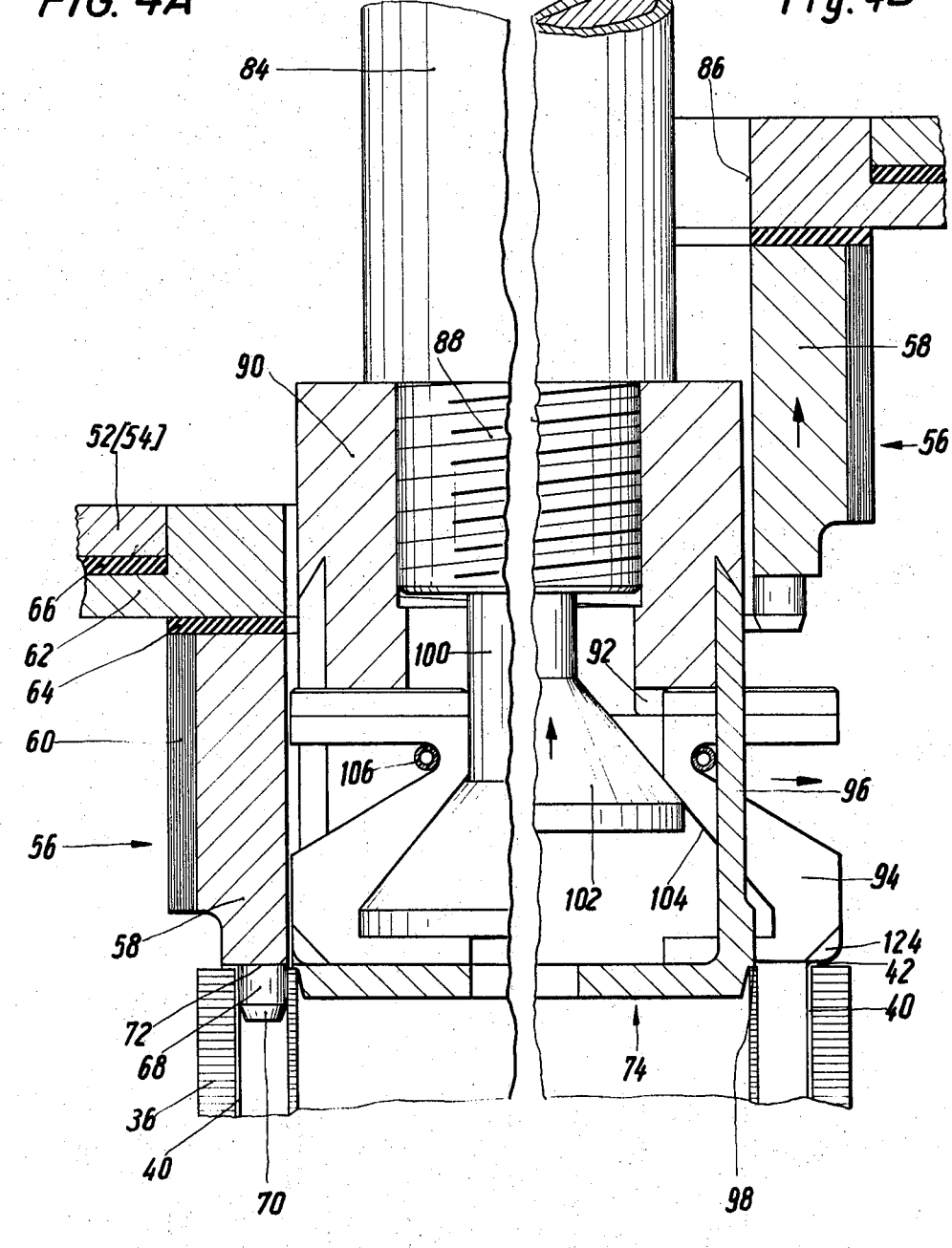
FIGS. 4A and 4B (referred to at times collectively as FIG. 4) are longitudinal sectional views through the left and right sides, respectively, of a cold/hot stamp apparatus according to FIGS. 1 and 3, each showing a different operating position thereof.
Figure 6:
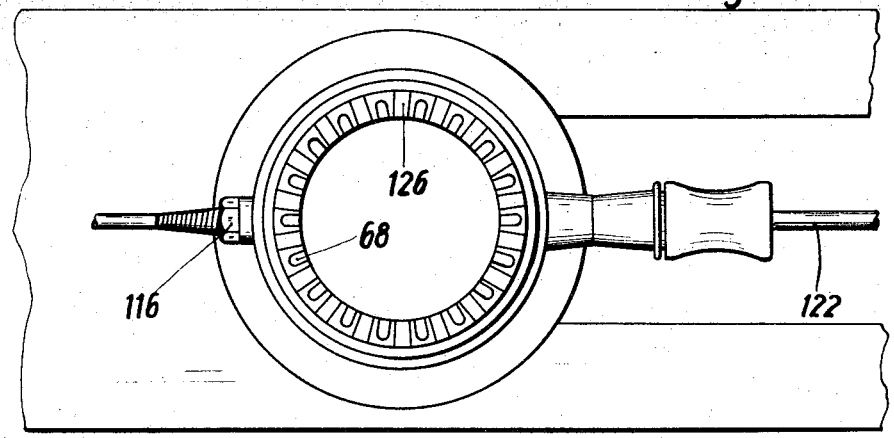
FIG. 6 is a bottom plan view of the stamp according to FIG. 5.
Figure 5:
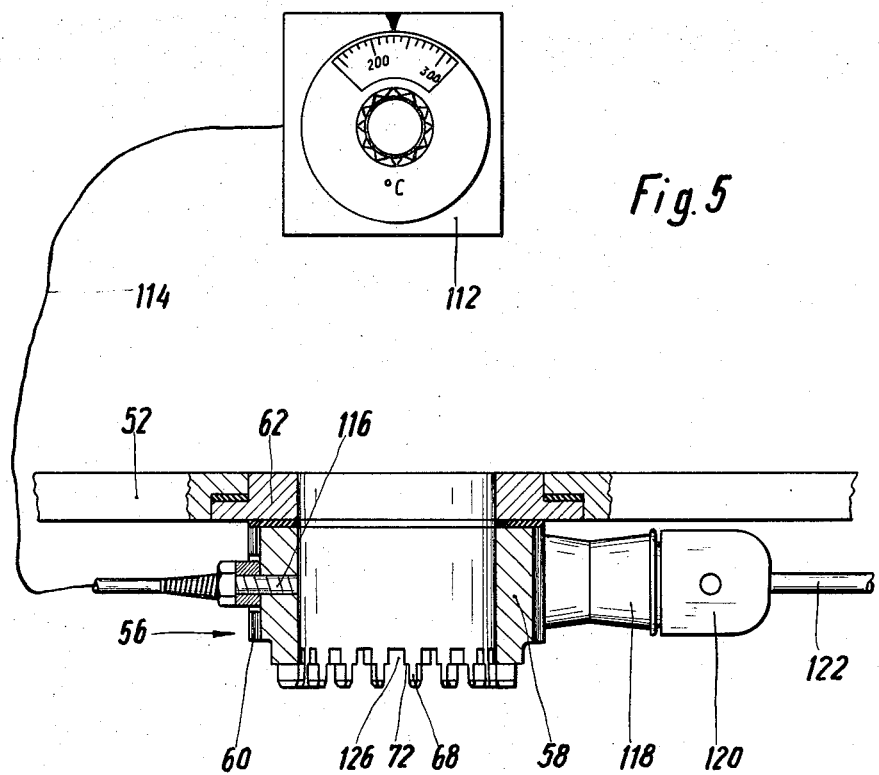
FIG. 5 is an axial sectional view through a suitable stamp.

The precise shape of the stamps 56 to be heated are clear from FIGS. 4 to 6. They consist basically of a ring 58, which is surrounded by a heating ring 60. The attachment of the stamp 56 on one of the rails 52 or 54 is accomplished in the present example by way of an intermediate flange 62 (FIG. 4), which is developed in a suitable manner in such a way, that various stamps 56 can be attached to it in an easily detachable manner. Between the ring 58 and the flange 62, as well as between the latter and the rail 52 or 54, heat insulators 64 and 66 have been provided, which at the same time cushion the thrusts during the impact of the stamps 56 on their respective laminated stator cores to dampem them.

At the free end of the ring 58 there are provided projections 68 which are distributed around the periphery of ring 68. The end of projections 68 are bevelled at 70. The number of projections 68 in the present example correspond to half the number of the grooves of the stator. Each projection 68 is surrounded by steplike stamp surface 72. With each stamp surface 72 at the end 42 of an insulating strip 40 is pressed against the end surface of the laminated stator core 36 during the hot molding process.

The four stamps 56 to be heated cooperate during each step with a cold stamp, altogether designated by 74, which is movable coaxially within said ring 58. These stamps, like the stamps 56, are attached in pairs at an upper rail 76 and a lower rail 78. An upper and a lower pneumatic cylinder 80, the piston rods 82 of which engage at the rail 76 or 78, serve as drives for the movement of these rails.

Figure 3:
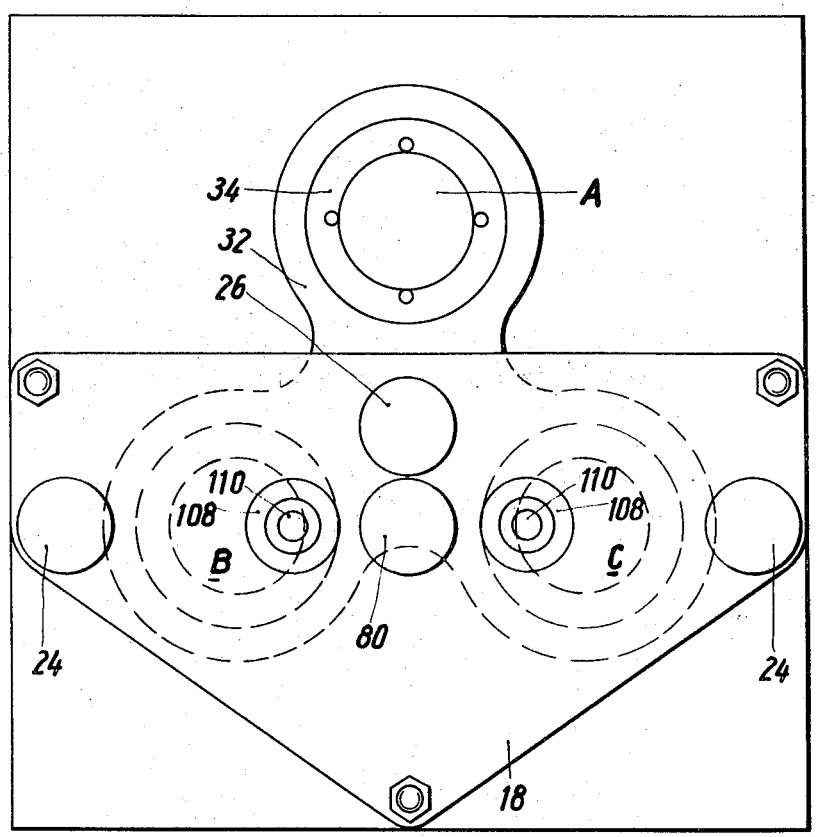
FIG. 3 is a top plan view of the apparatus according to FIGS. 1 and 2.

As can be seen in the top plan view of FIG. 3, the pneumatic cylinders 80 are located essentially on an imaginary connecting line of the threaded spindles 24 and the center axes of the operating stations B and C, and hence they are not in axial alignment with the central shaft 26.

Pneumatic cylinders 84 are seated on the rails 76 and 78 in pairs at positions corresponding to the operating stations B and C, which cylinders extend through bores 86 in the flanges 62 and through the ring 58 (see FIG. 4B). The lower ends of the cylinder housings of the pneumatic cylinders 84, which are each developed as a threaded journal 88, have screwed thereto guide bushings 90, which at their free ends are developed with a multiplicity of guide paths 92 distributed around their respective peripheries for radially shiftable fingers or flaps 94. These flaps 94, which correspond in number and position on their periphery to the projections 68 on the hot stamp, are to be considered as cold individual stamps, which are provided to hold down for a while yet the ends 42 of the insulating strips 40 as shown in FIG. 4B, after withdrawal of the hot stamp, in order that the ends 42 of the strips will not spring back after cooling down.

The flaps 94 are guided furthermore in longitudinal slits in the peripheral wall of a pot-shaped bushing 96 connected firmly with the bushing 90, but having thinner walls. Said bushing 96 is seated on the inside edge of the stator bore with front shoulder surface 98, whereby it projects somewhat into a stator bore with a bevelled front edge for stabilizing and centering bushing 96 relative to the stator bore.

A truncated cone 102 is connected to the piston rod 100 of the pneumatic cylinders 84 for pressing the flaps 94 radially outward counter to the effect of an annular spring 106 by way of a slanting surface 104 on said flaps whenever cone 102 is pulled up by the pneumatic cylinder 84. Guide rods 110, sliding in bearings 108 at the lower and upper machine plates 16, 18, guide the rails 76 and 78 with the cold stamps 74.

FIG. 5 shows a regulator 112, which is connected by means of a line connection 114 with a detecting element 116 on the ring 58. The desired temperature, for example 230°C, of the hot stamp 56 can be adjusted on the regulator 112. Furthermore the electric connection of the heating ring 60 by way of the plug 118 and 120 and an electric wire an an electric connection 112 are shown in FIG. 5.

The previously described apparatus operates as follows:

While the rails 52 and 54 as well as the rails 76 and 78 are in their pulled back positions, a laminated stator core 36 is inserted at the operating station A of the revolving table 32 into the receiving support 34. Insulating strips 40 are already in the stator grooves, the ends of which project upwards and downwards from the ends of the laminated stator core. Since the insulating strips are bent together elastically into an essentially U-shaped cross section and since they strive to spread out again in their respective stator grooves, they are clamped firmly enough in said grooves so that they will not drop out. Now the revolving table 32 is turned counterclockwise by 120° in relation to FIG. 1. As a result, the laminated stator core reaches the operating station B. By engagement of the balls 38 with the laminated stator core, it will be ensured that at the operating station B and likewise later on at the operating station C, a projection 68 of the hot stamp and a flap 94 are aligned each time with an assigned stator groove. For reasons of space, only half the insulating strips are deformed in the present example at the operating station B, the other half then being deformed at the operating station C. For a smaller stator, all insulating strips could be bent back however at the same time. In that case, the revolving table 32 would need to have only two operating stations, one for loading and unloading, and one for deforming the strips.

During the continuous operation of the apparatus, let us start out with the assumption that in a certain intermediate phase a laminated stator core is located at all three operating stations A, B, C. At A it has just been inserted. At B and C one-half of the insulating strips are deformed synchronously in the same rhythm during each step, that is, all four heated stamps 56 are brought to bear against the stators concurrently by the two rails 52 and 54 being moved toward each other concurrently by the driving motor 44 via the threaded spindles 24. Screws or ball revolving spindles are preferred instead of other means such as a power cylinder, so that the upper and lower hot stamps move exactly evenly in the direction of the axis of the laminated stator cores. If, for example, the lower stamp would lead the upper one, then it would encounter the insulating strips sooner and would push the latter in front of itself instead of bending back the strip end. Because of the even approach of the opposed hot stamps 56, it is of no consequence whether or not all insulating strips are seated with exactly the same excess of their ends projecting from the stator grooves at the beginning of the operating process. Whenever an insulating strip is shifted further in one axial direction for any reasons whatever, then it is first again pushed to the middle position by the stamp 56 approaching from that end before the strip ends are turned back simultaneously from above and below by the two stamps.

The projections 68 of the heated annular stamp move at a relatively high speed into the stator grooves lined with insulating strips. The ends of the insulating strips are therefore not yet thoroughly heated when they are turned back by the shoulder surfaces 72 against the end surfaces of the laminated stator core. It would seem to appear that the U-shaped cross section of the insulating strips would complicate the bending process. However as it surprisingly turns out, the strip material nevertheless does not break. It is therefore apparently possible, but not necessary, to heat the ends of the insulating strips for some time prior to the bending process. However it will be sufficient when using a hot stamp, to perform the two steps in the process, i.e. heating and deforming, at essentially the same time.

The projections 68 should be long enough to form a guide for the strips within the stator grooves during the simultaneous pressure of the stamps from both sides, in order to avoid any buckling or denting of the strips.

The hot stamps 56 will remain in the position of FIG. 4A for a few seconds, then the rails 52 and 54 are again spread apart by the driving motor 44. It is important that the cold stamps be applied to the warm bent back ends of the insulating strips very promptly after removal of the hot stamps and that they be held there until the strips have cooled off, for otherwise the strips will rise by themselves again. It was found that the time between the withdrawal of the hot stamp and the application of contact pressure by the cold stamp must not be more than about 2 seconds. With the described embodiment this short time period can be maintained. While the hot stamps 56 are withdrawn, the pneumatic cylinders 80 push the cold stamps forward until they fit against the shoulder surfaces 98 at the laminated stator core. Since the stamps 56 and 74 are disposed coaxially with respect to each other, it would be possible basically to move the cold stamp 74 initially together with the hot stamps 56 against the laminated stator cores. However, it is more effective to keep the cold stamps 74 in their withdrawn position during the hot molding process so that they will remain as cool as possible and thus will cool down the ends of the insulating strips more quickly after they are applied thereto. In this manner, a short cycle time will be achieved without any additional cooling apparatus (although such additional cooling apparatus could be used if desired which might at times be the case).

By a suitable sequence control, the flaps 94 are moved radially outwardly after the hot stamp 56 has been withdrawn sufficiently as shown in FIG. 4B. In order to permit the flaps 94 to slide smoothly over the bent ends 42 of the insulating strips without abutting against them, the leading edges of the flaps 94 are narrowed similarly to the bow of a ship, as indicated at 124 in FIG. 4. The bent back ends 42 of the insulating strips are cooled down between the flaps 94 and the end surfaces of the laminated stator core, and when the flaps 94 are then pulled back by the annular spring 106 after about 2 to 3 seconds and when the cold stamps 74 are spread apart again axially by the rails 76 and 78, the bent back ends 42 of the insulating strips retain their smoothly fitting shape at the end surfaces of the laminated stator core without springing back. The revolving table 32 can now be turned by 120° and a new operating cycle can start.

It is clear from FIG. 5 that gaps or recesses 126 are provided between the projections 68, which recesses extend axially into the ring 58 beyond the shoulder surfaces 72. These particularly deep recesses are needed only whenever there is an adjacent insulating strip beside every insulating strip that is to be bent back at the end, as in the case of operating station B where the ends of said insulating strip still remaining stand erect and are bent back only at a later operating step, i.e. at the operating station C. In the case of the hot stamps of the operating station C, the recesses 126 can therefore be omitted.

The regulator 112, also shown in FIG. 5, has been set, in the present example, to a temperature of 230°C. A practical embodiment of the apparatus according to the invention operates with this temperature. Naturally however it is understood that the present invention includes variations from the above mentioned parameters depending on the material of the insulating strips, the machine construction chosen, et cetera.

Deviating from the described embodiment, the heating of the ends of the insulating strips could be accomplished also in some other suitable manner, for example heating can be applied by radiation, induction or hot air instead of by means of heated stamps.

Although the invention has been described in considerable detail with respect to a preferred embodiment, it will be apparent that the invention is capable of numerous modifications and variations apparent to those skilled in the art without departing from the spirit and scope of the invention.

I claim:

1. In the manufacture of stators of electrical machines, a process for bending back the ends of thermoplastic insulating strips located in the stator grooves, comprising the steps of:

placing strips of thermoplastic, electrically insulating material into the stator grooves such that the end portions of the strip project axially of the stator beyond the end faces thereof,
   heating the said projecting end portions,
   bending the heated projecting end portions back against the end faces of the stator, and
   holding the bent heated end portions against said stator end faces until they cool off.

2. The process of claim 1 wherein the strip is polyethyleneterephthalate.

3. The process of claim 1, including holding the said end portions bent back for at least 2 to 3 seconds by means of a hot stamp which also accomplishes heating of said end portions, withdrawing the hot stamp, and then within about 2 seconds after withdrawal of the hot stamp, carrying out said holding step by pressing a cold stamp down onto the end portions for about 2 to 3 seconds.

4. The process of claim 1, wherein the said heating step includes heating the said end portions to about 200° to 250°C.

5. The process of claim 4, wherein the end portions are heated to about 230°C.

6. The process of claim 1, wherein said heating step includes heating only the end portions of the insulating strips projecting beyond the end faces of the stator.

7. The process of claim 1, wherein both end portions of the insulating strips are bent back simultaneously.

8. The process of claim 1, including carrying out said steps of heating, bending and holding in two successive operations, the first operation accomplishing said heating, bending and holding on alternate insulating strips and the second operation performing said heating, bending and holding steps on the remaining insulating strips.

9. An apparatus for bending back the ends of thermoplastic insulating strips located in stator grooves comprising:

support means for receiving a stator with insulating strips located in the grooves thereof and end portions of the strip projecting beyond the end faces of the stator,
   means for heating the projecting end portions of the strips and for bending the heated end portions back against the stator end faces,
   and holding means separate from said heating and bending means for holding the heated bent back end portions against their respective end faces as the portions cool off.

10. An apparatus according to claim 9, said heating and bending means located at both ends of the stator and means for mounting the heating and bending means for simultaneous movement against opposed end faces of the stator for simultaneously heating and bending the opposite projecting end portions of the strips.

11. An apparatus according to claim 10, including a holding means, operatively associated with each heating and bending means, for holding the bent back end portions at their respective ends of the stator.

12. An apparatus according to claim 9, said heating and bending means comprising a hot stamp having means for heating the same and being movable axially against the end of the stator.

13. An apparatus according to claim 12, said hot stamp constituted by a plurality of individual hot stamps, each aligned with a groove of the stator and hence arranged to heat and bend an end portion of a strip in its respective groove.

14. An apparatus according to claim 12, said holding means constituted by a cold stamp associated with each hot stamp and having a plurality of individual cold stamps, the number and position of which correspond to the individual hot stamps.

15. An apparatus according to claim 14, said individual hot stamps being arranged on the outer side of an axially movable heated ring, said individual hot stamps consisting of a bending surface and projections having a cross-section corresponding to the cross-section of a stator groove, whereby the projections enter the groove as the surrounding bending surface engages and bends back the said end portion.

16. An apparatus according to claim 15, wherein the said heated ring is heated electrically.

17. An apparatus according to claim 15, said individual cold stamps comprising fingers located on a guide element and arranged around the axis of the stator, means for mounting the fingers for radial movement relative to the said guide element.

18. An apparatus according to claim 17, including means for moving the hot stamp axially and means for moving the cold stamp fingers radially, wherein after said hot stamp has been moved axially off of its respective end portions, the individual cold stamp fingers are movable radially against their respective end portions.

19. An apparatus according to claim 18, wherein the means for moving the fingers comprises a power cylinder connected to the guide element for driving the fingers radially.

20. An apparatus according to claim 19, said guide element including slots in which the fingers are mounted for radial movement, a central cone located on the axis of the ring and connected to the power cylinder, said cone positioned to engage and urge the fingers radially outwardly upon axial movement of the piston.

21. An apparatus according to claim 20, including spring means for withdrawing the fingers.

22. An apparatus according to claim 11, including means for mounting said support means for movement to at least two operating stations, a hot stamp and an associated cold stamp at each of said stations, the stamps of the first station arranged to bend back end portions of strips in alternate grooves of the stator, and the stamps of the other station arranged to bend back the end portions at the remaining grooves.

23. An apparatus according to claim 22, including, at each station, a hot stamp and an associated cold stamp associated with each axial end of the stator.

24. An apparatus according to claim 23, including means for moving the two hot stamps at each station simultaneously against their respective stator ends and further means for moving the two cold stamps at each station simultaneously against their respective stator ends.

25. An apparatus according to claim 24, wherein all of the hot stamps at the two stations are movable simultaneously in synchronism against their respective stator ends and all of the cold stamps at both stations are movable simultaneously in synchronism against their respective stator ends.

26. An apparatus according to claim 25, said means for moving the hot stamps simultaneously against their respective stator ends comprising rails mounting the hot stamps, said rails including nuts threadedly engaged with threaded spindles, the threading on the spindles being of an equal and opposite pitch on opposite ends of the stator so that the hot stamps at opposite ends of the stator can move at the same speed against their respective ends of the stator.

* * * * *